United States Patent
Gu et al.

(10) Patent No.: US 9,418,280 B2
(45) Date of Patent: Aug. 16, 2016

(54) IMAGE SEGMENTATION METHOD AND IMAGE SEGMENTATION DEVICE

(71) Applicant: BAIDU ONLINE NETWORK TECHNOLOGY (BEIJING) CO., LTD., Beijing (CN)

(72) Inventors: Jiawei Gu, Beijing (CN); Kai Yu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/571,918

(22) Filed: Dec. 16, 2014

(65) Prior Publication Data

US 2016/0125235 A1     May 5, 2016

(30) Foreign Application Priority Data

Nov. 5, 2014    (CN) .......................... 2014 1 0618207

(51) Int. Cl.
    *G06K 9/00*            (2006.01)
    *G06T 7/20*             (2006.01)
    *G06T 7/00*             (2006.01)

(52) U.S. Cl.
    CPC .......... *G06K 9/00375* (2013.01); *G06T 7/0081* (2013.01); *G06T 7/204* (2013.01); *G06T 7/2006* (2013.01); *G06T 2207/10016* (2013.01)

(58) Field of Classification Search
    CPC ................ G06K 9/00375; G06T 2207/10016; G06T 7/0081; G06T 7/2006; G06T 7/204

USPC .......................................................... 382/103
See application file for complete search history.

(56) References Cited

U.S. PATENT DOCUMENTS

| | | | | |
|---|---|---|---|---|
| 5,909,251 A | * | 6/1999 | Guichard | G06K 9/342 348/416.1 |
| 8,194,134 B2 | * | 6/2012 | Furukawa | G01S 3/7865 348/152 |
| 8,559,670 B2 | * | 10/2013 | Wang | G06K 9/00771 382/103 |
| 2012/0237114 A1 | * | 9/2012 | Park | G06T 7/0071 382/154 |
| 2013/0129205 A1 | * | 5/2013 | Wang | G06K 9/6278 382/164 |
| 2014/0253785 A1 | * | 9/2014 | Chan | H04N 5/144 348/349 |

* cited by examiner

*Primary Examiner* — Tom Y Lu
(74) *Attorney, Agent, or Firm* — Hodgson Russ LLP

(57) ABSTRACT

An image segmentation method and an image segmentation device are provided. The method comprises receiving a video image of a dynamic movement of a target object, acquiring a full-image optical flow of the video image to estimate a first displacement of each pixel therein, acquiring a background optical flow of the video image to estimate a second displacement of a background pixel therein; comparing the first displacement with the second displacement to obtain a foreground region of the target object; extracting feature points in the video image in the foreground region, calculating a probability density of the feature points to determine a number of the target objects; performing visual tracking and movement trajectory analysis on the target object to track the same; performing stationary judgment and image segmentation on the target object according to an interframe displacement of the feature points, an interframe cutting window similarity and tracking box scaling.

7 Claims, 2 Drawing Sheets

IMAGE SEGMENTATION METHOD AND IMAGE SEGMENTATION DEVICE

CROSS-REFERENCE TO RELATED APPLICATION

This application claims priority to and benefits of Chinese Patent Application Serial No. 201410618207.5, filed with the State Intellectual Property Office of P. R. China on Nov. 5, 2014, the entire content of which is incorporated herein by reference.

FIELD

The present disclosure relates to the field of Internet, and more particularly to an image segmentation method and an image segmentation device.

BACKGROUND

In the artificial intelligence field, how to enable smart wearable devices or robots to perform reorganization and identification in a natural interactive way becomes the core problem of the current study, in which the creation of a natural human-computer interaction is particularly important. Artificial intelligence devices and robots have been widely applied in various aspects of human life, and machine vision and recognition by human intervention should also be more convenient and efficient by means of new technologies, thus requiring a more natural way to perform machine recognition and image identification.

Currently, the input for image identification and machine vision recognition is performed by first taking pictures and then determining a target object. This process is often limited by the complexity of a shot content, and consequently many steps are needed and the learning cost is high. Moreover, the pictures shot need to subject to human intervention, for example, the pictures need to be delimited manually. In addition, the identification content cannot be accurately obtained by a machine so as to result in low identification accuracy, it is difficult to identify irregular objects, the operation is inconvenient, and the user experience is poor.

SUMMARY

Embodiments of the present disclosure seek to solve at least one of the problems existing in the related art to at least some extent.

According to a first aspect of the present disclosure, an image segmentation method is provided. The image segmentation method comprises receiving, at one or more computing devices, a video image of a dynamic movement of a target object; acquiring, at the one or more computing devices, a full-image optical flow of the video image and a background optical flow of the video image; estimating, at the one or more computing devices, a first displacement of each pixel in the video image based on the acquired full-image optical flow of the video image; estimating, at the one or more computing devices, a second displacement of a background pixel in the video image based on the acquired background optical flow of the video image; comparing, at the one or more computing devices, the first displacement with the second displacement to obtain a foreground region of the target object; extracting, at the one or more computing devices, feature points in the video image in the foreground region of the target object; calculating, at the one or more computing devices, a probability density of the feature points extracted to determine a number of the target objects; performing, at the one or more computing devices, a visual tracking and a movement trajectory analysis on the target object to track the target object; and performing, at the one or more computing devices, a stationary judgment and an image segmentation on the target object according to an interframe displacement of the feature points, an interframe cutting window similarity, and a tracking box scaling.

With the image segmentation method according to embodiments of the present disclosure, after the video image of the dynamic movement of the target object is received, the foreground region of the target object (i.e. the target object) may be determined by acquiring the full-image optical flow and the background optical flow, the target object is tracked during the dynamic movement of the target object, and the stationary judgment is performed on the target object and a region of the video image where the target object is located is segmented. Thus, when an object to be identified is identified, the user only needs to take or shake the target object to perform the image segmentation on the target object quickly, which may be used as an accurate identification input for the subsequent image identification of the target object.

According to a second aspect of the present disclosure, an image segmentation device is provided. The image segmentation device comprises one or more computing devices configured to execute one or more software modules, the one or more software modules including: a receiving module configured to receive a video image of a dynamic movement of a target object; an acquiring module configured to acquire a full-image optical flow of the video image to estimate a first displacement of each pixel in the video image, and to acquire a background optical flow of the video image to estimate a second displacement of a background pixel in the video image; a comparing module configured to compare the first displacement with the second displacement to obtain a foreground region of the target object; an extracting module configured to extract feature points in the video image in the foreground region of the target object; a calculating module configured to calculate a probability density of the feature points extracted to determine a number of the target objects; a tracking module configured to perform a visual tracking and a movement trajectory analysis on the target object to track the target object; and a segmenting module configured to perform a stationary judgment and an image segmentation on the target object according to an interframe displacement of the feature points, an interframe cutting window similarity and a tracking box scaling.

With the image segmentation device according to embodiments of the present disclosure, after the receiving module receives the video image of the dynamic movement of the target object, the foreground region of the target object (i.e. the target object) may be determined by acquiring the full-image optical flow and the background optical flow, the target object is tracked during the dynamic movement of the target object, and the stationary judgment is performed on the target object and a region of the video image where the target object is located is segmented. Thus, when an object to be identified is identified, the user only needs to take or shake the target object to perform the image segmentation on the target object quickly, which may be used as an accurate identification input for the subsequent image identification of the target object.

According to a third aspect of the present disclosure, a non-transitory computer readable storage medium is provided. The computer readable storage medium comprises a computer program for executing the image segmentation method according to the first aspect of the present disclosure, when running on a computer.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
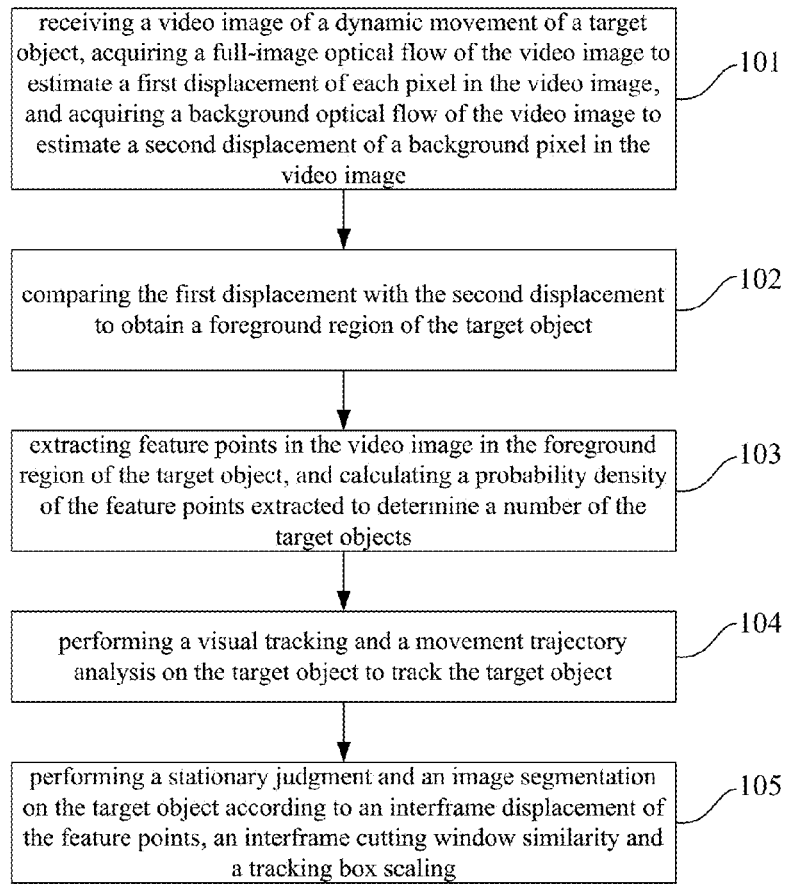
FIG. 1 is a flow chart of an image segmentation method according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

FIG. 1 is a flow chart of an image segmentation method according to an embodiment of the present disclosure.

As shown in FIG. 1, the image segmentation method comprises the following steps that may be performed on one or more computing devices.

In step 101, a video image of a dynamic movement of a target object is received, a full-image optical flow of the video image is acquired to estimate a first displacement of each pixel in the video image, and a background optical flow of the video image is acquired to estimate a second displacement of a background pixel in the video image.

In some embodiments, receiving the video image of the dynamic movement of the target object comprises: receiving the video image of the dynamic movement of the target object input via a camera.

Further, before the video image of the dynamic movement of the target object is received, an image identification request input via speech, a touch screen or a dynamic sensor is received so as to trigger an operation of receiving the video image.

In other words, in this embodiment, after a smart device with a camera receives the image identification request input by a user via speech, the touch screen or the dynamic sensor, the camera on the smart device is turned on. A process of taking or moving a target object by the user is shot via the camera, i.e. a video image of the process of taking or moving the target object by the user is received via the camera, and thus a subsequent process is executed.

In some embodiments, the smart device with the camera may be a smart mobile terminal with a camera, a headset wearable device (e.g., Google Glass or BaiduEye) with a camera, a smart watch with a camera, or a robot with a camera visual input. However, the present disclosure is not limited thereby.

In step 102, the first displacement is compared with the second displacement to obtain a foreground region of the target object.

Specifically, the first displacement of each pixel denotes "foreground region (target object) +background region (environment)", while the second displacement of the background pixel denotes "background region (environment)". After the first displacement is compared with the second displacement, the foreground region of the target object may be obtained. The algorithmic logic used may be simply expressed as "(foreground region+background region)–background region=foreground region".

In step 103, feature points in the video image in the foreground region of the target object are extracted, and a probability density of the feature points extracted is calculated to determine a number of the target objects.

In step 104, a visual tracking and a movement trajectory analysis are performed on the target object to track the target object.

In step 105, a stationary judgment and an image segmentation are performed on the target object according to an interframe displacement of the feature points, an interframe cutting window similarity and a tracking box scaling.

In this embodiment, after the image segmentation is performed on the target object, the image identification may be performed on this basis, and then the identification result is output to the user via an audio output channel or an image output channel of the smart device with the camera so as to complete the identification of the target object.

With the image segmentation method according to embodiments of the present disclosure, after the video image of the dynamic movement of the target object is received, the foreground region of the target object (i.e. the target object) may be determined by acquiring the full-image optical flow and the background optical flow, the target object is tracked during the dynamic movement of the target object, and the stationary judgment is performed on the target object and a region of the video image where the target object is located is segmented. Thus, when an object to be identified is identified, the user only needs to take or shake the target object to perform the image segmentation on the target object quickly, which may be used as an accurate identification input for the subsequent image identification of the target object.

Figure 2:
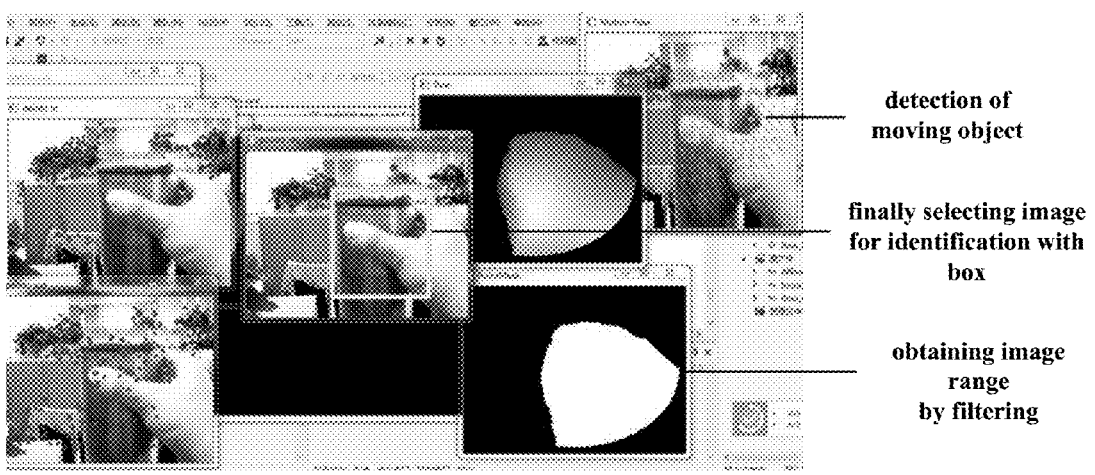
FIG. 2 is a schematic diagram of an image segmentation method according to an embodiment of the present disclosure.

FIG. 2 is a schematic diagram of an image segmentation method according to an embodiment of the present disclosure. As shown in FIG. 2, when a user takes an object by a hand from a first-person perspective or shakes the object by a hand naturally, with the method shown in FIG. 1, the dynamic movement of the hand is captured via the camera, the foreground region of the target object may be determined by acquiring the full-image optical flow and the background optical flow, the target object is tracked, and the stationary judgment and the image segmentation are performed on the target object and the target object is segmented, i.e. an image for the identification is selected with a box.

Figure 3:
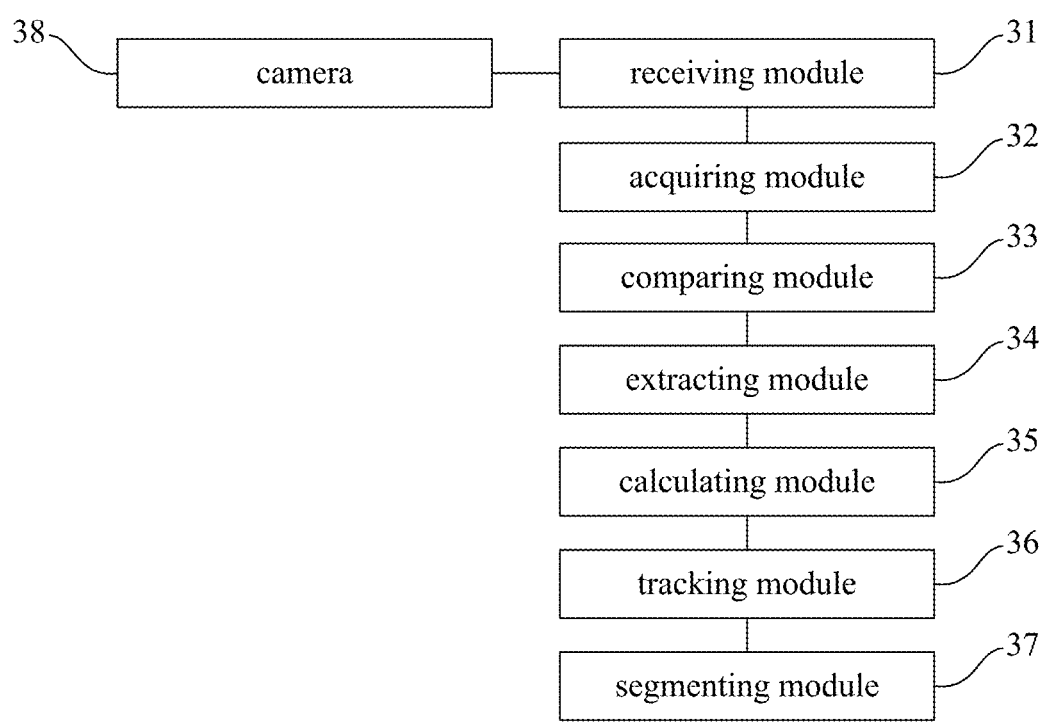
FIG. 3 is a block diagram of an image segmentation device according to an embodiment of the present disclosure.

FIG. 3 is a block diagram of an image segmentation device according to an embodiment of the present disclosure. The image segmentation device in this embodiment may be used to realize the image segmentation method as shown in FIG. 1.

The image segmentation device comprises a receiving module 31, an acquiring module 32, a comparing module 33, an extracting module 34, a calculating module 35, a tracking module 36 and a segmenting module 37. The modules 33-37 may be configured to be executed by one or more computing devices.

The receiving module 31 is configured to receive a video image of a dynamic movement of a target object. In this embodiment, the receiving module 31 receives the video image of the dynamic movement of the target object input via a camera 38. Further, the receiving module 31 is further configured to receive an image identification request input via speech, a touch screen or a dynamic sensor so as to trigger an operation of receiving the video image before receiving the video image of the dynamic movement of the target object.

In other words, in this embodiment, after the receiving module 31 receives the image identification request input by a user via speech, the touch screen or the dynamic sensor, the camera 38 is turned on. A process of taking or moving a target object by the user is shot via the camera 38, i.e. a video image of the process of taking or moving the target object by the user is received via the camera 38, and thus a subsequent process is executed.

The acquiring module 32 is configured to acquire a full-image optical flow of the video image to estimate a first displacement of each pixel in the video image, and to acquire a background optical flow of the video image to estimate a second displacement of a background pixel in the video image.

The comparing module 33 is configured to compare the first displacement with the second displacement to obtain a foreground region of the target object. Specifically, the first displacement of each pixel denotes "foreground region (target object)+background region (environment)", while the second displacement of the background pixel denotes "background region (environment)". After the comparing module 33 compares the first displacement with the second displacement, the foreground region of the target object may be obtained. The algorithmic logic used by the comparing module 33 may be simply expressed as "(foreground region+background region)−background region=foreground region".

The extracting module 34 is configured to extract feature points in the video image in the foreground region of the target object.

The calculating module 35 is configured to calculate a probability density of the feature points extracted by the extracting module 34 to determine a number of the target objects.

The tracking module 36 is configured to perform a visual tracking and a movement trajectory analysis on the target object to track the target object.

The segmenting module 37 is configured to perform a stationary judgment and an image segmentation on the target object according to an interframe displacement of the feature points, an interframe cutting window similarity and a tracking box scaling.

In this embodiment, after the image segmentation is performed on the target object, the image identification may be performed on this basis, and then the identification result is output to the user via an audio output channel or an image output channel of the image segmentation device so as to complete the identification of the target object.

In this embodiment, the image segmentation device may be a smart device with a camera, or a part of the smart device with the camera. In some embodiments, the smart device with the camera may be a smart mobile terminal with a camera, a headset wearable device (e.g., Google Glass or BaiduEye) with a camera, a smart watch with a camera, or a robot with a camera visual input. However, the present disclosure is not limited thereby.

With the image segmentation device according to embodiments of the present disclosure, after the receiving module 31 receives the video image of the dynamic movement of the target object, the foreground region of the target object (i.e. the target object) may be determined by acquiring the full-image optical flow and the background optical flow, the target object is tracked during the dynamic movement of the target object, and the stationary judgment is performed on the target object and a region of the video image where the target object is located is segmented. Thus, when an object to be identified is identified, the user only needs to take or shake the target object to perform the image segmentation on the target object quickly, which may be used as an accurate identification input for the subsequent image identification of the target object.

Image identification is the most important breakthrough in artificial intelligence, and has quite a wide range of valuable use scenes, which is the top priority in the future search field. The present disclosure employs a new human-computer interaction and a natural user interface, which is more natural and more convenient compared with the conventional image identification by first taking pictures and then delimiting the target object. Natural interaction is particularly important for the image identification function of a smart wearable device, and in the present disclosure, the user may take an object to obtain a search result, which may realize a more natural interaction and a better experience of the user.

The image segmentation method according to embodiments of the present disclosure may be applied to various smart devices performing visual image information capturing and processing from the first view, and may provide a basic technical support for the gesture recognition of smart wearable vision products.

The image segmentation method according to embodiments of the present disclosure may provide a revolutionary experience for a user who interacts with artificial intelligence products or robots having an image recognition ability and a visual recognition ability. For example, an object is taken in front of a robot and shaken to enable the robot to recognize and identify the object.

A non-transitory computer readable storage medium according to embodiments of the present disclosure is also provided. The computer readable storage medium comprises a computer program for executing the image segmentation method according to the above embodiments of the present disclosure, when running on a computer.

It should be noted that, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented image segmentation method, comprising:
   receiving, at one or more computing devices, a video image of a dynamic movement of a target object;
   acquiring, at the one or more computing devices, a full-image optical flow of the video image and a background optical flow of the video image;
   estimating, at the one or more computing devices, a first displacement of each pixel in the video image based on the acquired full-image optical flow of the video image;
   estimating, at the one or more computing devices, a second displacement of a background pixel in the video image based on the acquired background optical flow of the video image;
   comparing, at the one or more computing devices, the first displacement with the second displacement to obtain a foreground region of the target object;
   extracting, at the one or more computing devices, feature points in the video image in the foreground region of the target object;
   calculating, at the one or more computing devices, a probability density of the feature points extracted to determine a number of the target objects;
   performing, at the one or more computing devices, a visual tracking and a movement trajectory analysis on the target object to track the target object; and
   performing, at the one or more computing devices, a stationary judgment and an image segmentation on the target object according to an interframe displacement of the feature points, an interframe cutting window similarity, and a tracking box scaling.

2. The image segmentation method according to claim 1, wherein receiving the video image of the dynamic movement of the target object comprises:
   receiving, at the one or more computing devices, the video image of the dynamic movement of the target object input via a camera.

3. The image segmentation method according to claim 1, further comprising:
   receiving at the one or more computing devices, an image identification request input via speech, a touch screen, or a dynamic sensor so as to trigger an operation of receiving the video image.

4. A computer-implemented image segmentation device, comprising:
   one or more processors configured to execute one or more software modules, the one or more software modules including:
      a receiving module configured to receive a video image of a dynamic movement of a target object;
      an acquiring module configured to acquire a full-image optical flow of the video image to estimate a first displacement of each pixel in the video image, and to acquire a background optical flow of the video image to estimate a second displacement of a background pixel in the video image;
      a comparing module configured to compare the first displacement with the second displacement to obtain a foreground region of the target object;
      an extracting module configured to extract feature points in the video image in the foreground region of the target object;
      a calculating module configured to calculate a probability density of the feature points extracted to determine a number of the target objects;
      a tracking module configured to perform a visual tracking and a movement trajectory analysis on the target object to track the target object; and
      a segmenting module configured to perform a stationary judgment and an image segmentation on the target object according to an interframe displacement of the feature points, an interframe cutting window similarity and a tracking box scaling.

5. The image segmentation device according to claim 4, further comprising:
  a camera, wherein the receiving module is configured to receive the video image of the dynamic movement of the target object input via the camera.

6. The image segmentation device according to claim 4, wherein the receiving module is further configured to receive an image identification request input via speech, a touch screen or a dynamic sensor so as to trigger an operation of receiving the video image.

7. A non-transitory computer readable storage medium, comprising a computer program configured to execute the following steps on one or more computing devices:
  receiving a video image of a dynamic movement of a target object, acquiring a full-image optical flow of the video image to estimate a first displacement of each pixel in the video image, and acquiring a background optical flow of the video image to estimate a second displacement of a background pixel in the video image;
  comparing the first displacement with the second displacement to obtain a foreground region of the target object;
  extracting feature points in the video image in the foreground region of the target object, and calculating a probability density of the feature points extracted to determine a number of the target objects;
  performing a visual tracking and a movement trajectory analysis on the target object to track the target object; and
  performing a stationary judgment and an image segmentation on the target object according to an interframe displacement of the feature points, an interframe cutting window similarity and a tracking box scaling.

* * * * *